United States Patent
Vaideeswaran et al.

(10) Patent No.: US 10,200,242 B2
(45) Date of Patent: Feb. 5, 2019

(54) SYSTEM AND METHOD TO REPLICATE SERVER CONFIGURATIONS ACROSS SYSTEMS USING STICKY ATTRIBUTIONS

(71) Applicant: Dell Products, LP, Round Rock, TX (US)

(72) Inventors: Ganesan Vaideeswaran, Bangalore (IN); Naman Goel, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 617 days.

(21) Appl. No.: 14/880,751

(22) Filed: Oct. 12, 2015

(65) Prior Publication Data

US 2017/0104628 A1 Apr. 13, 2017

(51) Int. Cl.
*G06F 15/177* (2006.01)
*H04L 12/24* (2006.01)

(52) U.S. Cl.
CPC .............. *H04L 41/0816* (2013.01)

(58) Field of Classification Search
CPC .................................. H04L 41/0816
USPC ........................................ 709/221
See application file for complete search history.

(56) References Cited

U.S. PATENT DOCUMENTS

| | | | | |
|---|---|---|---|---|
| 6,975,592 B1 * | 12/2005 | Seddigh | ............... | H04L 47/10 370/230 |
| 7,254,624 B2 * | 8/2007 | Kinyon | ............... | G06F 9/44505 709/220 |
| 7,380,205 B2 * | 5/2008 | Bezrukov | ............... | G06F 17/2229 707/999.102 |
| 7,526,457 B2 * | 4/2009 | Duevel | ............... | G06F 9/44505 702/181 |
| 7,685,412 B1 * | 3/2010 | Burdick | ............... | G06F 9/44505 713/1 |
| 8,122,111 B2 * | 2/2012 | Shekar CS | ............... | G06F 9/44505 709/220 |
| 8,290,984 B2 * | 10/2012 | Vandanapu | ............... | G06F 8/76 707/796 |
| 8,326,953 B2 * | 12/2012 | Jin | ............... | H04L 41/0803 709/206 |
| 8,386,407 B2 * | 2/2013 | Meliksetian | ............... | G06Q 10/06 706/46 |
| 8,397,208 B2 * | 3/2013 | Brown | ............... | G06F 8/71 717/101 |
| RE44,299 E * | 6/2013 | Backman | ............... | G06F 9/4416 701/1 |
| 8,793,808 B2 * | 7/2014 | Boccon-Gibod | ............... | G06F 21/10 705/57 |
| 9,311,251 B2 * | 4/2016 | Biswas | ............... | G06F 12/126 |
| 9,891,893 B2 * | 2/2018 | Standley | ............... | G06F 8/34 |
| 9,891,907 B2 * | 2/2018 | Searle | ............... | G06F 8/65 |

(Continued)

*Primary Examiner* — Melvin H Pollack
(74) *Attorney, Agent, or Firm* — Larson Newman, LLP

(57) ABSTRACT

An information handling system includes a memory to store a configuration file, a provisioning server, and a server. The provisioning server detects a new server within the information handling system, and provides the configuration file new server. The server includes a controller to communication with the provisioning server, the controller to receive the configuration file from the provisioning server, to resolve a sticky attribute in the configuration file based on a type of the sticky attribute, to update the configuration file in response to resolving the sticky attribute, and to apply the updated configuration file to the server to configure components within the server.

20 Claims, 6 Drawing Sheets

(56) References Cited

U.S. PATENT DOCUMENTS

| | | | |
|---|---|---|---|
| 9,917,842 B2* | 3/2018 | Xie | H04L 63/102 |
| 2007/0005662 A1 | 1/2007 | Bankston et al. | |
| 2008/0104215 A1 | 5/2008 | Excoffier et al. | |
| 2017/0351588 A1* | 12/2017 | Brown | H04L 67/1034 |
| 2018/0024901 A1* | 1/2018 | Tankersley | G06F 17/30525 |
| | | | 707/694 |

* cited by examiner

SYSTEM AND METHOD TO REPLICATE SERVER CONFIGURATIONS ACROSS SYSTEMS USING STICKY ATTRIBUTIONS

FIELD OF THE DISCLOSURE

The present disclosure generally relates to information handling systems, and more particularly relates to replicating server configurations across systems using sticky attributes.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

An information handling system can include multiple servers that can be added individually to the information handling system. Each of the servers can be configured via a controller of the server based on attributes and components defined in a configuration file.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
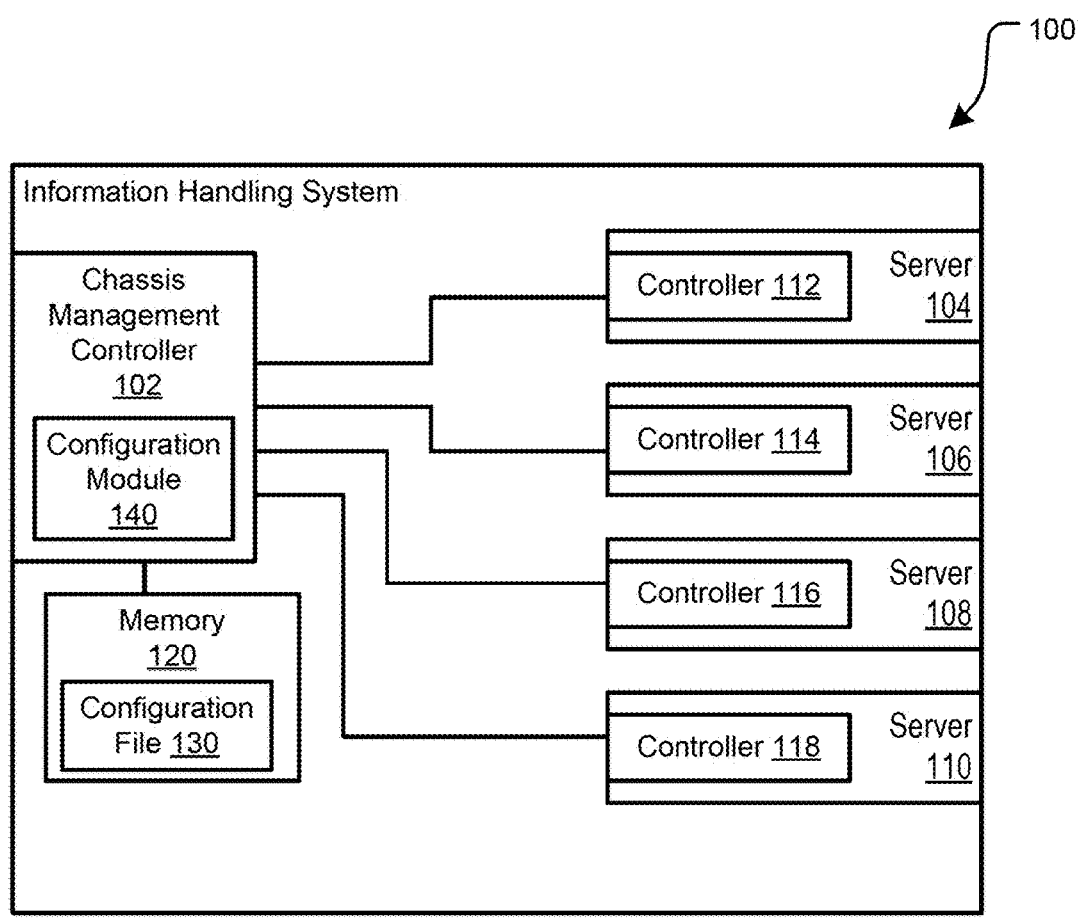
FIG. 1 is a block diagram of an information handling system.

FIG. 1 shows an information handling system 100. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

The information handling system 100 includes a chassis management controller 102, servers 104, 106, 108, and 110, controllers 112, 114, 116, and 118, and a memory 120. The chassis management controller 102 is in communication with server 104 via controller 112, with server 106 via controller 114, with server 108 via controller 116, with server 110 via controller 118, and with memory 120. The chassis management controller 102 includes a configuration module 140. In an embodiment, the information handling system 100 can be initially provisioned with servers 104, 106, and 108.

During operation of the information handling system 100, a user or operator can create a configuration file 130 that can be used to configure new servers added to the information handling system. In an embodiment, the configuration file can be a server configuration Extensible Markup Language (XML) file, which the configuration module 130 can utilize to capture and configure different configurations of a reference server, such as server 104. In an embodiment, the configuration file 130 may be stored in the memory 120 for access by the chassis management controller 102. The user can access the configuration module 140 and launch a configuration file set up operation to create the configuration file 130 through the multiple graphical user interfaces (GUIs) as will be discussed with respect to FIGS. 2-4 below.

Figure 2:
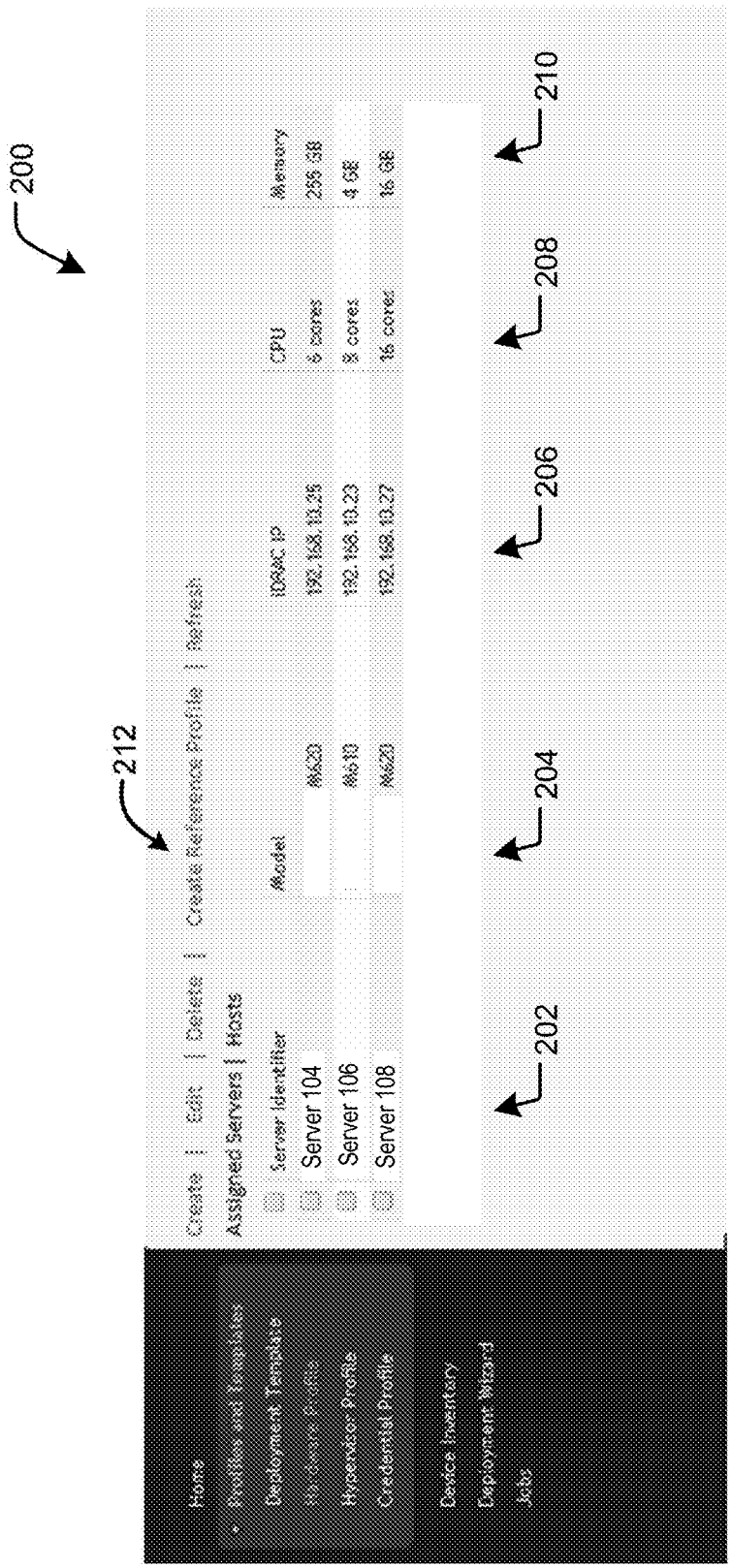
FIG. 2 is a diagram illustrating a server selection graphical user interface provided by the information handling system.

FIG. 2 shows a server selection GUI 200 including a list of server identifiers (IDs) 202, a list of server models 204, a list of Internet Protocol (IP) addresses 206, a list of central processor units (CPUs) 208, and a list of memory capacity 210. The list of server IDs 202 can provide the ID for each server in the information handling system 100, such as server 104, 106, and 108. The list of server models 204 can provide the user with the model number for each server, such as M610, M620, or the like. The list of IP addresses 206 can provide the IP address for the controller of each server. The list of CPUs 208 provides the user with the number of CPUs in each server. The list of memory capacity 210 provides the user with the amount of memory in each server.

In an embodiment, a user can use the list of server identifiers 202, the list of server models 204, the list of IP addresses 206, the list of CPUs 208, and the list of memory capacity 210 of each server to determine the server that the user would like to set as the reference server for the configuration file 130. The user can select a server, such as server 104, as the reference server by clicking the check box next to the desired server. The user can then selected the create reference profile link 212 to use the selected server as the reference server for the configuration file. Upon the user selecting the reference profile link 212, the configuration module 140 can provide a profile creation GUI 300 as shown in FIG. 3.

Figure 3:
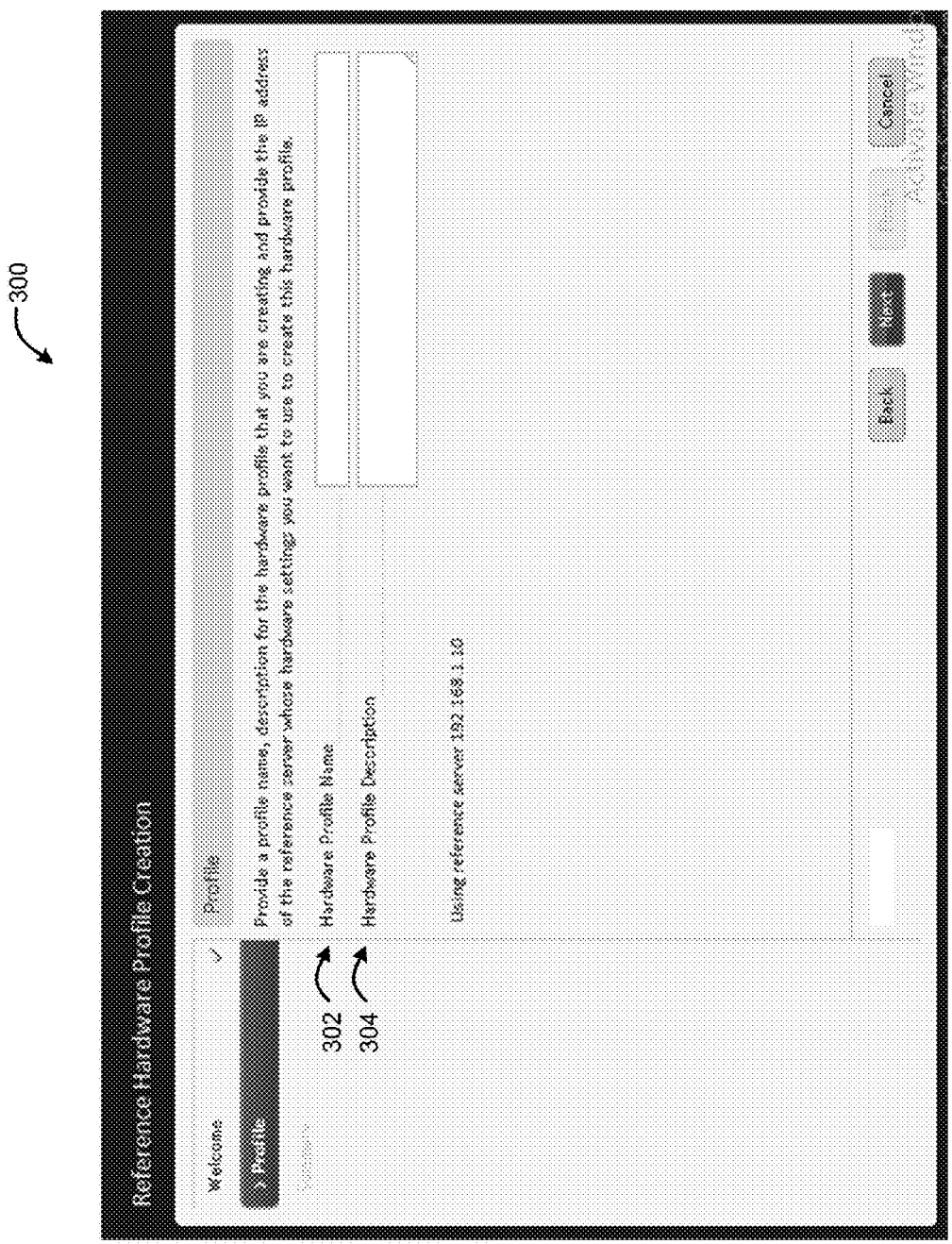
FIG. 3 is a diagram illustrating a profile creation graphical user interface provided by the information handling system.

FIG. 3 shows a profile creation GUI 300 including a hardware profile name 302, and a hardware profile description 304. The user can then provide a name for the profile in the blank associated with the hardware profile name 302, and may describe the profile, if wanted, in the hardware profile description 304. The specific server, such as server 104, that is associated with the hardware profile name 302 and hardware profile description 304 can be identified in the profile creation GUI 300 based on the IP address of the controller, such as controller 112, as shown in FIG. 3. The user may then select the next to continue setting up the configuration file 130 based on the selected reference server 104.

Figure 4:
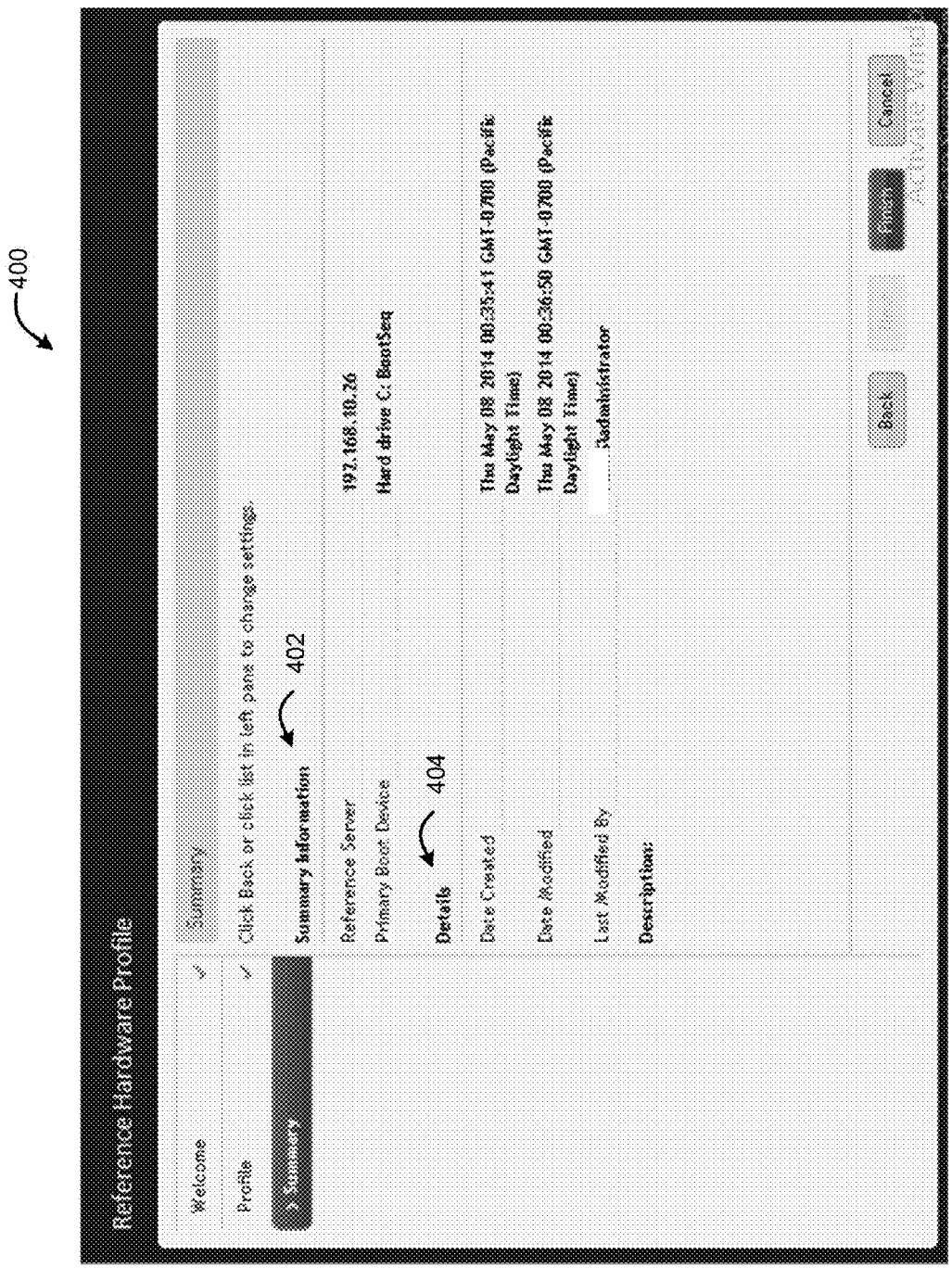
FIG. 4 is a diagram illustrating a summary graphical user interface provided by the information handling system.

FIG. 4 shows a summary GUI 400 for the creation of the reference server for the configuration file 130. The summary GUI 400 includes summary information 402 and details 404. In an embodiment, the summary information 402 can include the IP address for the controller of the reference server, and the location of a primary boot device for the reference server. In an embodiment, the details 402 can include information related to when the configuration file 130 was created and the person that created the configuration file.

Referring back to FIG. 1, during the creation of the configuration file 130, the user can define different attributes as sticky attributes, such that the attribute is only applied if a particular condition is met. For example, when a new server is being configured based on the configuration file 130, a sticky attribute may only be applied if a particular component is located in a particular slot of a new server as identified in the configuration file 130. In an embodiment, if some of the attributes, such as attributes associated with a component being located in a particular slot of the server, of the configuration file 130 were not sticky attributes, the configuration file may fail during set up of the new server. For example, the configuration file 130 may include information identifying that a physical disk is located in a specific slot of a server, and the controller of the new server may attempt to configure the same slot in the new server as a physical disk slot based on the configuration file. However, a different component may be located in that particular slot of the new server and the physical disk of the new server may be located in a different slot. In this situation, the configuration of the new server based on the configuration file 130 may fail.

However, if this attribute was a sticky attribute, the controller of the new server, prior to applying the configuration file 130 to the new server, can remove this attribute from the configuration file in response to determining that the component and slot of the new server does not match the component and slot of the configuration file. Thus, the user can identify different attributes in the configuration file 130 as sticky attributes during the creation of the configuration file to enable the controller of the automatically resolve conflicts in the configuration file to prevent failure of the configuration file.

In an embodiment, the configuration file 130 can contain components and attributes for a reference server. The components are identified using fully qualified device descriptor (FQDD), and any references to resources, such as physical disk, network interface controller port, virtual disk, or the like, may also be uniquely identified using FQDD. In an embodiment, attributes can be properties associated with the components, and the attributes can be modified. There can be different types of attributes in the configuration file 130, such as create-only attributes, sticky attributes, conditional attributes, or the like. In an embodiment, the create-only attributes can be attributes that can only be set once, such as at the time when the object is created. In an embodiment, conditional attributes can be attributes that are used to identify if a resource can be used, whether the specific component configuration is applicable, if there is conditional configuration, or the like. In an embodiment, the sticky attributes can be define as "sticky" based on the attributes being tied to or always applied to a specific environment.

In an embodiment, the stickiness of an attribute can be at different levels: none; slot; server; site; model; or the like. An attribute can be defined a having no stickiness in response to the attribute being independent of the environment or information handling system that the attribute is within, and only specific to the associated component. In this situation, an attribute does not have any stickiness if the attribute is the same for the component without taking in account the information handling system, the server, or the like that the component is installed. If the attribute is slot sticky, the attribute is only specific to the slot that the component is installed and the slot can be identified by a virtual media access control (MAC) address of the slot, world wide port name (WWPN) of the server, static IP address of the server, or the like.

In an embodiment, the attribute can be a server sticky attribute, such that the attribute is specific to a server identified using the service tag, the node ID, or the like. In an embodiment, that service tag or node ID can be server host name, server operating system, location information, or the like. If the attribute is a site sticky attribute, the attribute is specific to a site and the site can be identified by a network time protocol (NTP) server IP address, A/D settings, lightweight directory access protocol (LDAP) settings, location information, NIC-Internet small computer system interface (iSCSI) (NIC-iSCSI) initiator settings, or the like. The model sticky attributes identify that the attribute or component is associated with a specific model. When a model is specified, a version of element/generation is included in the configuration file so that the target controller can determine any cause for absence of the attribute in the server. In an embodiment, if the conditional attributes are not present when the configuration file is initially created, the conditional attributes can be added to configuration file 130 at a later point in time.

After the configuration file 130 is created, the configuration module 140 can store the configuration file in the memory 120. In an embodiment, when the configuration file 130 is exported from the configuration module 140 and stored in the memory 120, the attributes within the configuration file are indicated as create-only attributes, sticky attributes, or conditional attributes. In an embodiment, the chassis management server 102 can act as a provisioning server for newly added servers in the information handling system 100, other information handling systems in communication with the information handling system 100, or the like. In different embodiments, any of the existing servers 104-108 can act as the provisioning server.

In an embodiment, the user can add a new server, such as server 110, to the information handling system 100. When server 110 is added to the information handling system 100, the chassis management controller 102, acting as the provisioning server, can auto discover the server 110 via communication with controller 118 of the server and can associate the configuration file 130 with the server 110. The controller 118 can remove any configurations of the server 110 prior to utilizing the configuration file 130 to configure the server 110. The controller 118 can then make a copy of the configuration file 130, and can use the copy of the configuration file to scan and resolve any sticky attributes in the copy of the configuration file.

The controller 118 can scan the configuration file 130 for attributes that are classified as none sticky. These attributes, if any, located within the configuration file 130 are retained as-is, such that the attributes do not change. The controller 118 can then determine whether any attributes are server sticky attributes. If the controller 118 determines that there are server sticky attributes in the configuration file 130, the controller can then determine whether a service tag or node ID of the server 110 matches the service tag or node ID associated with the server sticky attribute in the configuration file. The controller 118 can then retained any server sticky attributes that have matching service tags or node IDs that match the server 110, and can remove any server sticky attributes that do not have a matching service tag or node ID. For example, as described above, the configuration file 130 is created based on the reference server 104. In this situation, the service tag associated with server sticky attributes is the service tag, server 104. Thus, the service tag of server 110 does not match the service tag, server 104, associated with server sticky attributes in configuration file 130. Therefore, the controller 118 can remove any server sticky attributes in the copy of the configuration file.

The controller 118 can then determine whether the configuration file 130 includes any site sticky attributes. If the controller 118 determines that there are site sticky attributes, the controller can request the associated information for the site sticky attributes from the provisioning server, such as the chassis management controller 102. The chassis management controller 102 can maintain a database containing the information for the site sticky attributes in memory 120. In an embodiment, if there are multiple settings in the database, the multiple setting may be grouped together as a file and associated with the configuration file 130 at the time of assigning the configuration file to the target controller 118.

The controller 118 can then determine if any model sticky attributes are found in the configuration file, and can compare the model associated with the model sticky attributes to the model of the server 110. The controller 118 can then remove any attributes that have model numbers that do not match the model of the server 110, and apply the attributes with matching models. For example, the servers 104 and 110 can both have a model number M620. In this example, the controller 118 can retained all of the model sticky attributes, components and fields in the copy of the configuration file. For example, the basic input/output system (BIOS) settings for the model can be retained.

The controller 118 can then determine whether the copy of the configuration file includes any slot sticky attributes. In an embodiment, slot sticky attributes can be associated with conditional attributes. In this embodiment, any components which have invalid conditional attributes, such as LinkStatus=not connected, FirstFCTargetWWPN=0:0:0:0:0:0:0:0, or the like, are removed from the copy of the configuration file. The controller 118 then scans the copy of the configuration file to determine the resources associated with valid conditional slot sticky attributes to be scanned in the server 110. For example, the copy of the configuration file can identify a full-cover (FC) slot, two physical disks assigned to a virtual disk, and four NIC physical ports. The controller 118 can then scan the server 110 for components related to the components identified in the slot sticky attributes. In an embodiment, the scan of components or resources in the server 110 can result in the following resources or components being found: two FC slots, 5 physical disks, and four NIC physical ports. The controller 118 can then assign the discovered resources in the server 110 within the copy of the configuration file 130. For example, the FC slot in the server 110 can be assigned the component configuration found in the copy of the configuration file, two of the five physical disks in the server 110 can be assigned to the virtual disk configured in the copy of the configuration file, and the four NIC ports can be assigned to the four NIC port configurations in the copy of the configuration file. Thus, the controller 118 can replace the components identified by the slot sticky attributes with the actual components of the server 110 that are assigned the configurations found in the copy of the configuration file to create an updated configuration file. The controller 118 can then utilize the updated configuration file as the desired configuration of the server 110, and can configure the server 110 based on the updated configuration file.

In an embodiment, a user can create a maintenance configuration file to update the configurations of the servers 104-110 of the information handling system 100. For example, the user may want to add another virtual disk in the server, and update the iSCSI initiator settings on a NIC in the servers. In this situation, the user can create a virtual disk on a representative server, and can also configure iSCSI initiator settings on a NIC in the representative server. The user can then access the chassis management controller 102 to create the site settings file the database of the memory 120 using the same iSCSI initiator settings so that the chassis management controller can provide the correct information in response to the request by the controllers 112-118 for site sticky attributes in the maintenance configuration file.

The maintenance configuration file can be deployed in the information handling system 100, and the controllers 112-118 can each perform the operations described above except the operation of removing all of the current configurations of the servers 104-110. In an embodiment, the removal of current configurations is performed by the controllers 112-

118 in response to the associated server being added to the information handling system, and not in response to a maintenance configuration file being deployed to all existing servers.

Thus, the use of different types of sticky attributes, none, server, site, model, slot, or the like, enables a new server in the information handling system 100 to be configured and any conflicts between server and the configuration file 130 can be automatically resolved without active human intervention or failure of the configuration file. Additionally, the stickiness of attributes also enables information for the configuration of the server to be received from various sources. For example, for site sticky attributes the controller of the new server retrieves the information from a provisioning server, for model sticky attributes the controller retrieves the information from the configuration file, and for slot sticky attributes the controller retrieves the information in the new server.

Figure 5:
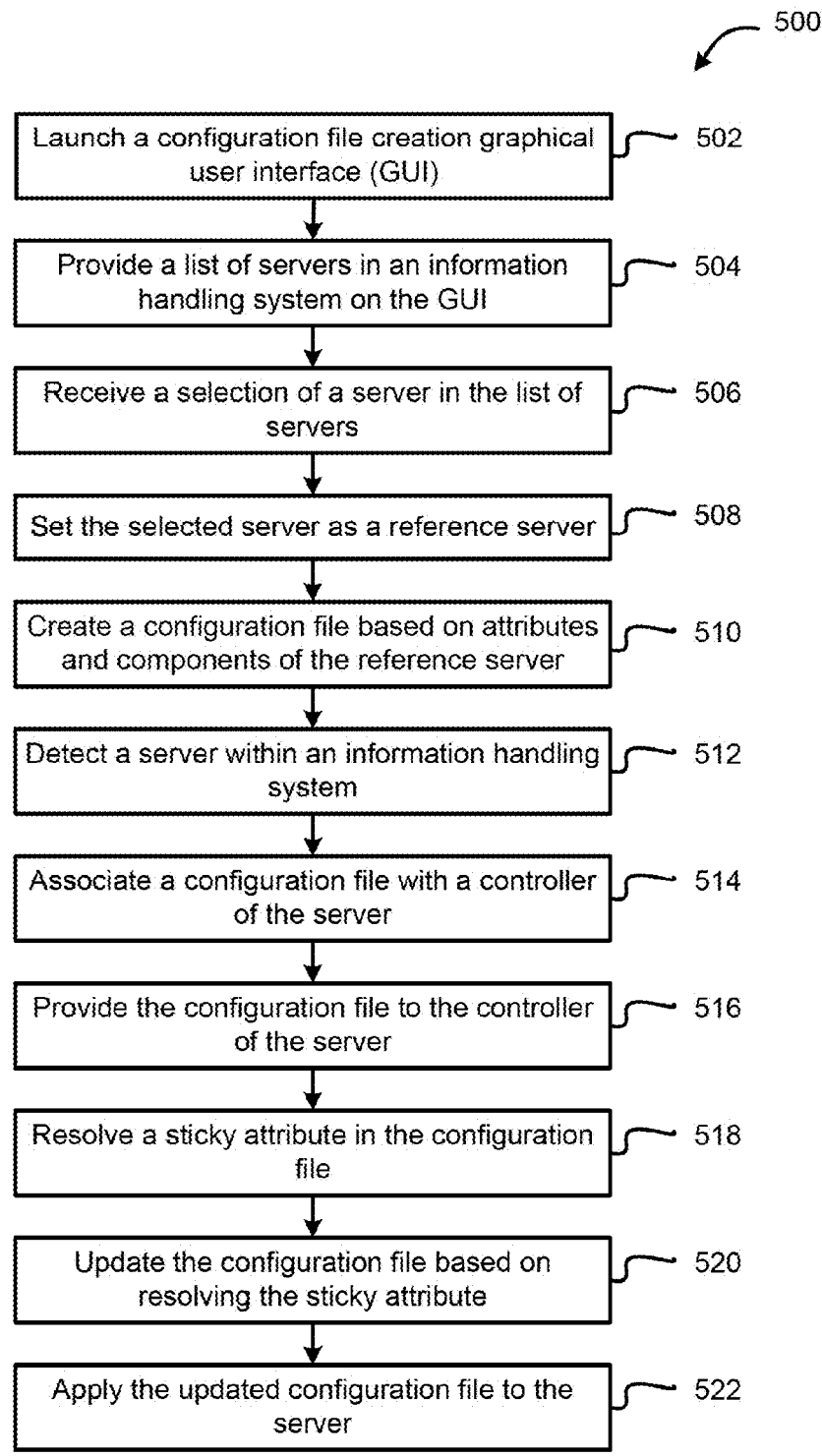
FIG. 5 is a flow diagram illustrating a method for configuring a new server in an information handling system based on sticky attributes in a configuration file.

FIG. 5 shows a flow diagram of a method 500 for configuring a new server in an information handling system based on sticky attributes in a configuration file. At block 502, a configuration file creation graphical user interface (GUI) is launched. In an embodiment, a configuration module of a chassis management controller can launch the configuration file creation GUI. A list of servers in the information handling system can be provided on the configuration file creation GUI at block 504. In an embodiment, the configuration file creation GUI can include descriptions, components, and the like for each of the listed servers. At block 506, a selection of a server in the list of servers is received.

At block 508, the selected server is set as a reference server. At block 510, a configuration file is created based on attributes of the reference server. In an embodiment, the configuration file can include create-only attributes, sticky attributes, conditional attributes, or the like. A new server is detected within the information handling system at block 512. In an embodiment, the new server can be detected by a provisioning server, such as the chassis management controller, any existing server in the information handling system, or the like. At block 514, the configuration file is associated with a controller of the new server. The configuration file is provided to the controller at block 516.

At block 518, a sticky attribute in the configuration file is resolved based on a type of the sticky attribute. In an embodiment, the sticky attribute is resolved as described below with respect to FIG. 6. The configuration file is then updated in response to resolving the sticky attribute to create an updated configuration file at block 520. At block 522, the updated configuration file is applied to the server to configure components within the server.

Figure 6:
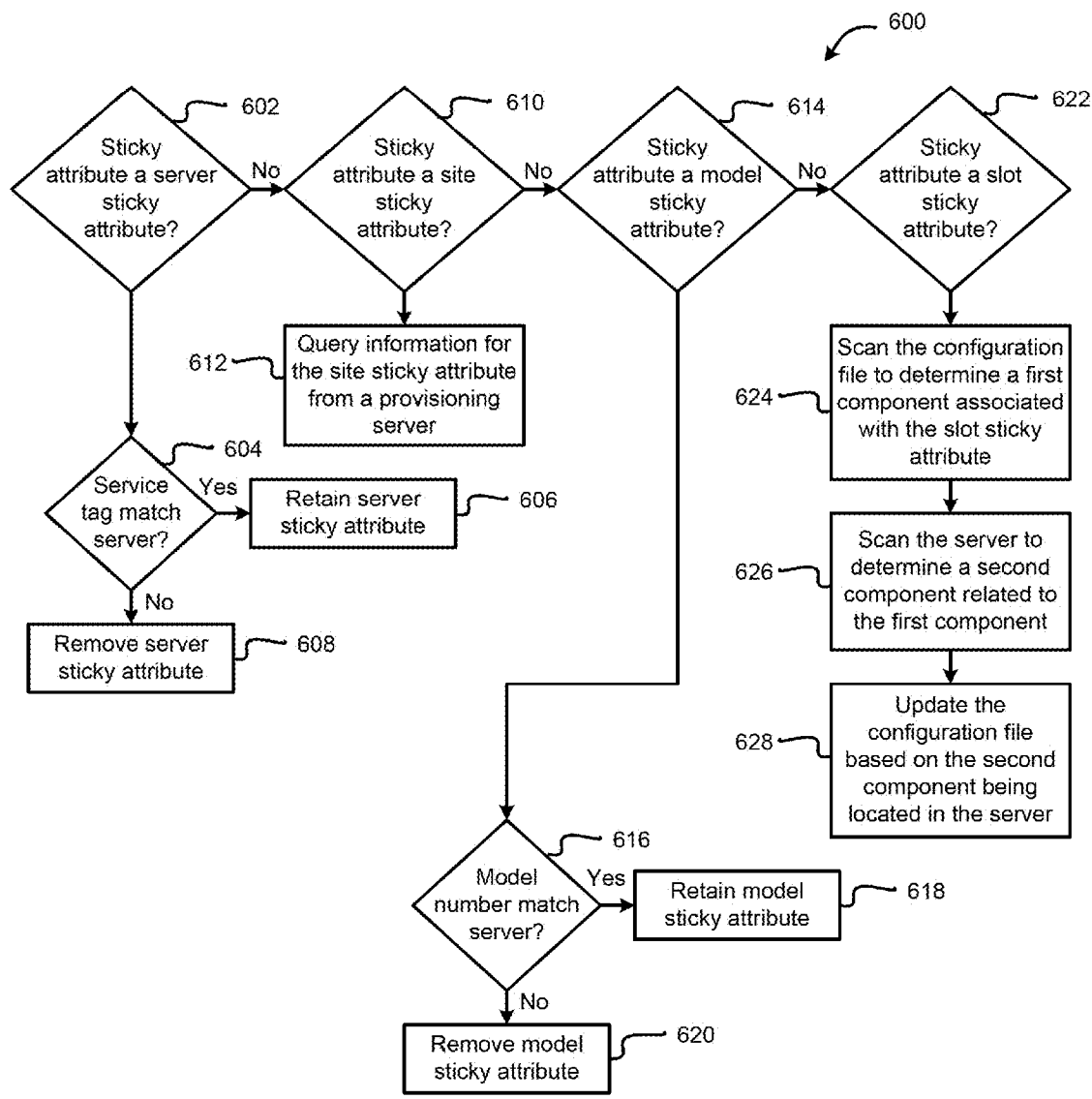
FIG. 6 is a flow diagram illustrating a method for resolving a sticky attribute to create an updated configuration file in the information handling system.

FIG. 6 shows a flow diagram of a method 600 for resolving a sticky attribute to create an updated configuration file. At block 602, a determination is made whether the sticky attribute is a server sticky attribute. If the sticky attribute is a server sticky attribute, a determination is made whether a service tag identifier in the configuration file matches a service tag of the controller at block 604. If the service tag identifier in the configuration file matches the service tag of the controller, the server sticky attribute is retained at block 606. Otherwise, if the service tag identifier in the configuration file does not match the service tag of the controller, the server sticky attribute is removed at block 608. If the sticky attribute is not a server sticky attribute the flow continues at block 610.

At block 610, a determination is made whether the sticky attribute is a site sticky attribute. If the sticky attribute is a site sticky attribute, information about the site sticky attribute is queried from a provisioning server at block 612. If the sticky attribute is not a site sticky attribute the flow continues at block 614.

At block 614, a determination is made whether the sticky attribute is a model sticky attribute. If the sticky attribute is a model sticky attribute, a model number associated with the model sticky attribute is compared to a model number of the server at block 616. If the model number associated with the model sticky attribute matches the model number of the server, the model sticky attribute is retained at block 618. Otherwise, if the model number associated with the model sticky attribute matches the model number of the server, the model sticky attribute is removed at block 620. If the sticky attribute is not a model sticky attribute the flow continues at block 622.

At block 622, a determination is made whether the sticky attribute is a slot sticky attribute. If the sticky attribute is a slot sticky attribute, the configuration file is scanned to determine a first component associated with the slot sticky attribute at block 624. At block 626, the server is scanned for a second component related to the first component. The configuration file is updated to create an updated configuration file based on the second component being located in the server at block 628. In an embodiment, the configuration file is update by the first component being replaced with the second component in the updated configuration file.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   detecting, by a provisioning server, a server within an information handling system;
   associating a configuration file with a controller of the server;
   providing the configuration file to the controller;
   resolving, by the controller, a sticky attribute in the configuration file based on a type of the sticky attribute, wherein the type of the sticky attribute is selected from a list including none, server, site, model, and slot;
   updating the configuration file in response to resolving the sticky attribute to create a first updated configuration file; and
   applying the first updated configuration file to the server to configure components within the server.

2. The method of claim 1, wherein resolving the sticky attribute in the configuration file based on the type of the sticky attribute comprises:
   determining whether the sticky attribute is a server sticky attribute; and
   in response to the sticky attribute being the server sticky attribute:
      determining whether a service tag identifier matches the controller; and
         in response to the service tag identifier matching the controller, retaining the server sticky attribute, otherwise removing the server sticky attribute.

3. The method of claim 1, wherein resolving the sticky attribute in the configuration file based on the type of the sticky attribute comprises:
   determining whether the sticky attribute is a site sticky attribute; and
   in response to the sticky attribute being the site sticky attribute, querying the site sticky attribute from the provisioning server.

4. The method of claim 3, wherein the site sticky attribute is stored within a database of the provisioning server, and in response to the database including multiple settings in the database, the multiple settings are grouped together and associated with the configuration file at a time of assigning the configuration file to the controller.

5. The method of claim 1, wherein resolving the sticky attribute in the configuration file based on the type of the sticky attribute comprises:
   determining whether the sticky attribute is a model sticky attribute; and
   in response to the sticky attribute being the model sticky attribute:
      comparing a model number associated with the model sticky attribute to a model number of the server; and
      removing the model sticky attribute in response to the model number associated with the model sticky attribute not matching the model number of the server, otherwise applying the model sticky attribute.

6. The method of claim 1, wherein resolving the sticky attribute in the configuration file based on the type of the sticky attribute comprises:
   determining whether the sticky attribute is a slot sticky attribute;
   in response to the sticky attribute being the slot sticky attribute:
      scanning the configuration file to determine a first component associated with the slot sticky attribute;
      scanning the server for a second component related to the first component; and
      update the configuration file to create a second updated configuration file based on the second component being located in the server.

7. The method of claim 6, wherein updating the configuration file to create the second updated configuration file based on the second component being located in the server comprises:
   replacing the first component with the second component in the second updated configuration file.

8. An information handling system comprising:
   a memory to store a configuration file;
   a provisioning server coupled to the memory, the provisioning server to detect a new server within the information handling system, and to provide the configuration file to the new server; and
   a server coupled to the provisioning server, the server including a controller to communicate with the provisioning server, the controller to receive the configuration file from the provisioning server, to resolve a sticky attribute in the configuration file based on a type of the sticky attribute, wherein the type of the sticky attribute is selected from a list including none, server, site, model, and slot, to update the configuration file in response to resolving the sticky attribute, and to apply the updated configuration file to the server to configure components within the server.

9. The information handling system of claim 8, wherein the controller to resolve the sticky attribute in the configuration file based on the type of the sticky attribute comprises:
   the controller to determine whether the sticky attribute is a server sticky attribute, and in response to the sticky attribute being the server sticky attribute: to determine whether a service tag identifier matches the controller, and in response to the service tag identifier matching the controller, to retain the server sticky attribute, otherwise removing the server sticky attribute.

10. The information handling system of claim 8, wherein the controller to resolve the sticky attribute in the configuration file based on the type of the sticky attribute comprises:
    the controller to determine whether the sticky attribute is a site sticky attribute, and in response to the sticky attribute being the site sticky attribute, to query the site sticky attribute from the provisioning server.

11. The information handling system of claim 10, wherein the site sticky attribute is stored in a database in the memory, and in response to the database including multiple settings in the database, the provisioning server to group the multiple settings together and associated with the configuration file at a time of assigning the configuration file to the controller.

12. The information handling system of claim 8, wherein the controller to resolve the sticky attribute in the configuration file based on the type of the sticky attribute comprises:
    the controller to determine whether the sticky attribute is a model sticky attribute, and in response to the sticky attribute being the model sticky attribute, to compare a model number associated with the model sticky attribute to a model number of the server, and to remove the model sticky attribute in response to the model number associated with the model sticky attribute not matching the model number of the server, otherwise to apply the model sticky attribute.

13. The information handling system of claim 8, wherein the controller to resolve the sticky attribute in the configuration file based on the type of the sticky attribute comprises:

the controller to determine whether the sticky attribute is a slot sticky attribute, and in response to the sticky attribute being the slot sticky attribute: to scan the configuration file to determine a first component associated with the slot sticky attribute, to scan the server for a second component related to the first component, and to update the configuration file to create a second updated configuration file based on the second component being located in the server.

14. The information handling system of claim 13, wherein the controller to update the configuration file to create the second updated configuration file based on the second component being located in the server comprises:

the controller to replace the first component with the second component in the second updated configuration file.

15. A method comprising:

selecting a reference server in an information handling system;

creating a configuration file based on attributes of the reference server;

detecting, by a provisioning server, a server within the information handling system;

associating the configuration file with a controller of the server;

providing the configuration file to the controller;

resolving, by the controller, a sticky attribute in the configuration file based on a type of the sticky attribute, wherein the type of the sticky attribute is selected from a list including none, server, site, model, and slot;

updating the configuration file in response to resolving the sticky attribute to create a first updated configuration file; and applying the first updated configuration file to the server to configure components within the server.

16. The method of claim 15, wherein resolving the sticky attribute in the configuration file based on the type of the sticky attribute comprises:

determining whether the sticky attribute is a server sticky attribute; and in response to the sticky attribute being the server sticky attribute:

determining whether a service tag identifier matches the controller; and in response to the service tag identifier matching the controller, retaining the server sticky attribute, otherwise removing the server sticky attribute.

17. The method of claim 15, wherein resolving the sticky attribute in the configuration file based on the type of the sticky attribute comprises:

determining whether the sticky attribute is a site sticky attribute; and in response to the sticky attribute being the site sticky attribute, querying the site sticky attribute from the provisioning server.

18. The method of claim 15, wherein resolving the sticky attribute in the configuration file based on the type of the sticky attribute comprises:

determining whether the sticky attribute is a model sticky attribute; and in response to the sticky attribute being the model sticky attribute:

comparing a model number associated with the model sticky attribute to a model number of the server; and removing the model sticky attribute in response to the model number associated with the model sticky attribute not matching the model number of the server, otherwise applying the model sticky attribute.

19. The method of claim 15, wherein resolving the sticky attribute in the configuration file based on the type of the sticky attribute comprises:

determining whether the sticky attribute is a slot sticky attribute;

in response to the sticky attribute being the slot sticky attribute:

scanning the configuration file to determine a first component associated with the slot sticky attribute;

scanning the server for a second component related to the first component; and update the configuration file to create a second updated configuration file based on the second component being located in the server.

20. The method of claim 19, wherein updating the configuration file to create the second updated configuration file based on the second component being located in the server comprises:

replacing the first component with the second component in the second updated configuration file.

* * * * *